(12) United States Patent
Hanemann et al.

(10) Patent No.: US 7,499,625 B2
(45) Date of Patent: Mar. 3, 2009

(54) FIBER OPTIC MATERIAL AND THE USE THEREOF

(75) Inventors: Thomas Hanemann, Stutensee (DE); Johannes Böhm, Bruchsal (DE); Jürgen Hausselt, Germersheim (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 10/551,471

(22) PCT Filed: Mar. 20, 2004

(86) PCT No.: PCT/EP2004/002949

§ 371 (c)(1),
(2), (4) Date: Sep. 30, 2005

(87) PCT Pub. No.: WO2004/090583

PCT Pub. Date: Oct. 21, 2004

(65) Prior Publication Data

US 2006/0204202 A1  Sep. 14, 2006

(30) Foreign Application Priority Data

Apr. 10, 2003 (DE) ................ 103 16 414

(51) Int. Cl.
*G02B 6/00* (2006.01)
*C08K 5/34* (2006.01)
*C08K 5/15* (2006.01)
*C08L 33/12* (2006.01)
*C08L 67/00* (2006.01)

(52) U.S. Cl. .............. 385/143; 524/256; 524/89; 524/111; 524/560; 524/601

(58) Field of Classification Search ............ 524/81, 524/89, 582

See application file for complete search history.

(56) References Cited

U.S. PATENT DOCUMENTS

| | | | | |
|---|---|---|---|---|
| 5,064,264 A | * | 11/1991 | Ducharme et al. | 385/130 |
| 5,308,986 A | | 5/1994 | Walker | |
| 5,606,638 A | * | 2/1997 | Tymianski et al. | 385/143 |
| 2003/0085387 A1 | * | 5/2003 | Fujiyama et al. | 252/582 |
| 2003/0161605 A1 | * | 8/2003 | Heyningen et al. | 385/141 |

FOREIGN PATENT DOCUMENTS

WO  WO 03/012500 A      2/2003
WO  WO 03012500 A1 *    2/2003

OTHER PUBLICATIONS

Chemla et al, Nonlinear Optical Properties of Organic Molecules and Crystals, 1986, Academic Press, vol. 2, pp. 221-253.*
Gott, 1971, J. Phys. B: Atom. Molec. Phys., 1971, vol. 4, pp. 116-123.*
Patent Abstract of Japan, vol. 0082, No. 08 (P-302), Sep. 21, 1984, & JP 59 090805 A (Nihon ITA Class KK), May 25, 1984.
Database WPI Derwent Publications Ltd., London, GB; AN 1984-167731.
Advanced Materials for Optics And Electronics, vol. 10, 2000, pp. 3-7.

* cited by examiner

*Primary Examiner*—Vasu Jagannathan
*Assistant Examiner*—Karuna P Reddy
(74) *Attorney, Agent, or Firm*—Venable LLP; Keith G. Haddaway

(57) ABSTRACT

The invention relates to a fiber optic material which comprises a polymer and at least one organic compound introduced therein. Said organic compound is a condensed aromatic ring system having two or more aromatic rings that are isocyclic or heterocyclic, wherein every heteroatom is associated with exactly one ring if the ring is heterocyclic. The fiber optic material according to the invention is preferably used for the core of an optical waveguide.

10 Claims, No Drawings

FIBER OPTIC MATERIAL AND THE USE THEREOF

The invention relates to a fiber optic material, consisting of a transparent organic solid matter, as well as its use for an optical waveguide.

An optical waveguide essentially consists of a core of fiber optic material and a cladding surrounding this material. Light is conducted through the optical waveguide as a result of the total reflection at the boundary layer between core and cladding, wherein total reflection occurs as long as the refractive index of the core is higher than that of the cladding. For the optical waveguide function, light is coupled on one side of the optical waveguide into the fiber optic material located therein. The light transmitted through the fiber optic material is then coupled out of the optical waveguide on the other side.

Traditional optical waveguides are made either from quartz glass or a plastic material (polymer), wherein these have refractive index values of 1.46 and/or 1.50. As compared to optical waveguides made from glass fibers, the optical waveguides made from polymer are cheap to produce and, above all, have the advantage of being flexible.

Optical waveguides can be produced with the aid of a number of known production methods. From reference DE 41 24 176 A1, as well as from a dissertation by M. Jöhnck, "POLYACRYLATE UND POLYACTONE FÜR ANWENDUNGEN IN EINMODIGEN, INTEGRIERT OPTISCHEN, PASSIVEN WELLENLEITERN [*Polyacrylates and Polylactones for Use in Single-Mode Integrated Optical Passive Waveguides*], University of Dortmund, 2000, for example, it is known that polymer optical waveguides can be produced from acrylate-based polymers. The refractive index for the optical waveguide follows from the chemical synthesis and is thus fixed for a specific material. A new polymer, for which the synthesis generally requires a high expenditure, must be used to vary the refractive index.

It is generally desirable to increase the refractive index of the core through the admixture of a suitable material, so as to achieve total reflection over a wide range. Primarily in the field of micro-optics, polymers with the highest possible refractive index are needed to reduce losses (Fresnel losses) when light is coupled into the optical waveguide.

According to W. Pfleging, J. Böhm, E. Gaganidze, Th. Hanemann, R. Heidinger, K. Litfin, *Direct laser-assisted processing of polymers for micro-fluidic and micro-optical applications*, Proc. SPE Vol. 4977: *Photon Processing in Microelectronics and Photonics II in Laser Applications in Microelectronics and Optoelectronic Manufacturing VIII*, Photonics West Conference, 2003, it is proposed in this connection to increase the refractive index in the core of the optical waveguide by introducing nanoscale inorganic, ceramic filler materials into the liquid polymer. By optimizing the dispersion of these filler materials, the refractive index of the core can be increased and/or lowered easily. However, with the dispersion of the filler materials in the reaction resin, the properties of the optical waveguide worsen significantly. The viscosity of the reaction resin increases with the increase in the share of ceramics, such that further processing, for example the filling of a channel-type structure on the substrate, becomes more difficult or completely impossible. The optical transmission through the optical waveguide is furthermore decreased strongly, meaning the area of application for optical waveguides of this type is restricted considerably.

Alternatively, transparent organic filler materials can also be introduced into the liquid polymer. Reference DE 37 10 889 A1 discloses polymers, including polymethylmethacrylate (PMMA), which are suitable for use as non-linear optical materials following the intercalation of components with the structural element of a pyrrolo[1.2-b]azine. The use of polymers such as PMMA as fiber optical material with therein integrated non-polymerizing components such as phthalic acid ester or benzoic acid ester for achieving higher transparency and for varying the refractive index is known from reference EP 0 615 141 A1. However, these polymers have the disadvantage of lowering the glass-transition point in the polymer and thus have a somewhat lower temperature resistance. In addition, the mechanical capacity is also slightly reduced.

Starting with this premise, it is the object of the present invention to provide a fiber optic material not subject to the aforementioned disadvantages and restrictions, for which the refractive index, in particular, is easy to determine while the transmission and viscosity are not reduced, as well as to disclose its use.

With respect to the fiber optic material, this object is solved with the features disclosed in claim 1 and with respect to the use, this object is solved as described in claim 9. Advantageous embodiments of the invention are described in the dependent claims.

A fiber optic material according to the invention is based on a transparent organic solid matter, comprising at least one polymer or also a blend of polymers and monomers. Polymers such as polymethylmethacrylate (PMMA) or polyester and/or monomers such as methylmethacrylate (MMA) are preferably used for this.

The advantageous properties of the fiber optic material according to the invention are achieved by introducing electron-rich organic compounds into the initially non-charged organic solid matter (polymer). The charging rates in this case generally range from 0-30 percent, but can also reach values of up to 50% and above. Condensed aromatic ring systems are suitable for use as organic compounds, wherein these are understood to be isocyclic systems comprising more than one carbon ring with the individual carbon rings having joint carbon atoms. These include, for example, phenanthrene, fluorene, benz[a]anthracene, triphenylene, anthracene, 2,3-benzanthracene or 11H-benzo[b]fluorene.

According to one alternative embodiment, carbon atoms belonging only to a single carbon ring are replaced with heteroatoms in the condensed aromatic ring systems. Examples for this are benzo[h]quinoline, phenantroline or phenanthridine for which the heteroatom is a nitrogen atom.

According to one preferred embodiment, condensed aromatic ring systems with three rings are used, for example phenanthrene, fluorene, benzo[h]quinoline, phenantroline or phenanthridine. Also suitable are condensed aromatic ring systems with four rings, such as benzanthracene, 11H-benzo[b]fluorene or triphenylene.

Particularly preferred in this case are ring systems with an angular arrangement of the rings. The definition of angular follows from the difference between anthracene and phenanthrene. Whereas the three carbon rings in anthracene are arranged in a straight line, the lines connecting the central points of the rings for phenanthrene, which is isomeric thereto, form an angle. Particularly preferred compounds with carbon rings in an angular arrangement are the isocyclical phenanthrene, fluorene, and benz[a]anthracene. The reason for the particular suitability of this class of substances probably lies in the fact that their dipole moments differ from zero, owing to the arrangement of the carbon atoms and/or the heteroatoms, which results in a very noticeable increase in the refractive index for the fiber optic material.

One alternative embodiment uses heterocyclical condensed aromatic ring systems in which each heteroatom is clearly assigned to a ring. These include, in particular, benzo[h]quinoline, 1,10-phenanthroline, phenanthridine, and 1,7-phenantroline. The compounds of this substance class also have a dipole moment which differs from zero and results in a clear increase in the refractive index for the fiber optic material.

According to a different embodiment, condensed aromatic ring systems are used which consist of two rings and comprise nitrogen atoms and/or oxygen atoms as heteroatoms. Examples for this are 1,2-benzioxazole and benzofuran which also have a dipole moment that differs from zero, thus increasing the refractive index in the fiber optic material.

The material according to the invention is used for the core of optical waveguides. According to one preferred embodiment, the optical waveguide cores in this case are positioned on a substrate in the form of a charged channel structure with a cover layer deposited thereon. Optical waveguides according to the invention have an optical refractive index of the core which can be adjusted for a wavelength in the range of 200 nm to 2000 nm, in particular ranging from 300 nm to 1900 nm.

The fiber optic material according to the invention is produced by initially providing a curable organic material into which one or several of the aforementioned organic compounds are dissolved. Together with the therein dissolved organic compounds, the curable organic material is subsequently allowed to cure and form a transparent organic solid matter. A blend consisting of a monomer and a polymer is generally selected for the curable organic material, which can additionally comprise a photostarter for accelerating the light-induced curing (polymerization), as well as a release agent.

The organic compound is preferably stirred by means of a high-performance mixer into the curable organic material and is then preferably subjected to ultrasound.

The clear liquid which is present in this case is cured over the course of a few minutes by being subjected to light induction or is filled directly into prepared channels. According to an alternative embodiment, optical micro-components such as micro-optical benches, Mach-Zehnder interferometers, or optical components such as directional couplers, Y-couplers and others are formed, for example in an injection-molding apparatus. According to a different embodiment, the polymer waveguide charged with the organic substances can be produced in a single operational step by means of the so-called 2-component injection-molding technique.

The curing occurs by means of light with a wavelength ranging from 200 nm to 1000 nm, particularly preferred from 300 nm to 800 nm, and/or by means of heat.

The organic compounds according to the invention dissolve particularly well into reaction resins with low viscosity, up to a concentration of 30%, and in part significantly change the refractive index of the cured reaction resin, whereas its optical transmission remains nearly unchanged.

The present invention proposes a new class of charged-polymer optical waveguides, in particular having the following advantages:

The refractive index of optical waveguide cores can be varied easily and, in particular, can be increased.

The optical characteristics of the non-charged polymer, above all its transmission and viscosity, are maintained.

The viscosity can even be lowered as compared to non-treated systems, which positively influences the processing ability.

The coupling with other fiber optic components having a high refractive index is easier.

The production is easy and cheap.

The invention is explained in further detail in the following with the aid of exemplary embodiments.

According to Table 1, an organic compound according to the invention is added to a liquid starting batch, comprising a polymer and if necessary a monomer, a separating agent, and a photostarter. The starting batch has a volume between 10 ml and 250 ml. A high-performance mixer is used to stir this starting batch for a period of 1 to 5 minutes at a speed of 10000 to 25000 rpm before it is placed for another 5 minutes into an ultrasound bath. The resulting clear liquid is then cured for several minutes by means of light induction to allow a small panel to form, measuring 2 cm×6 cm and having a thickness of 1 mm, or it is filled directly into preformed channels.

Table 1 furthermore contains the maximum charging rate for the organic compound introduced into the aforementioned polymer, the transmission without scattered light at 1550 nm and, insofar as it is determined, the resulting refractive index at 633 nm of the fiber optic material used for the core of an optical waveguide.

TABLE 1

| No | liquid starting batch | organic compound | structure | maximum filling degree | transmission (1550 nm) | refractive index (633 nm) |
|---|---|---|---|---|---|---|
| 1 | PMMA, MMA, separating means, photostarter at a weight ratio of 78:20:1:1 | phenanthrene | 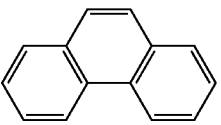 | 30% | 85%-90% | 1,537 |
| 1a | Polyester, separating means, photostarter at a weight ratio of 98:1:1 | phenanthrene | 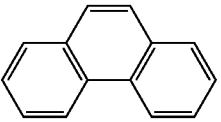 | 20% | 85%-90% | 1,591 |
| 2 | PMMA, MMA, separating means, photostarter at a weight ratio of 87:20:1:1 | fluorene | 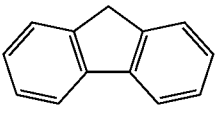 | 20% | 85%-90% | 1,518 |

TABLE 1-continued

| No | liquid starting batch | organic compound | structure | maximum filling degree | transmission (1550 nm) | refractive index (633 nm) |
|---|---|---|---|---|---|---|
| 2a | Polyester, separating means, photostarter at a weight ratio of 98:1:1 | fluorene | 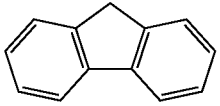 | 20% | 85%-90% | 1,587 |
| 3 | PMMA, MMA, separating means, photostarter at a weight ratio of 78:20:1:1 | benzo[h]quinoline | 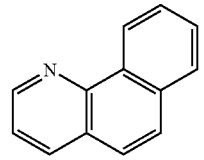 | 30% | 85%-90% | 1,547 |
| 4 | PMMA, MMA, separating means, photostarter at a weight ratio of 78:20:1:1 | 1,10 phenanthroline | 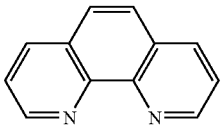 | 10% | 85%-90% | 1,507 |
| 5 | PMMA, MMA, separating means, photostarter at a weight ratio of 78:20:1:1 | phenanthridine | 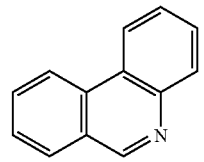 | 10% | 85%-90% | 1,506 |
| 6 | PMMA, MMA, separating means, photostarter at a weight ratio of 78:20:1:1 | 1,7 phenanthroline | 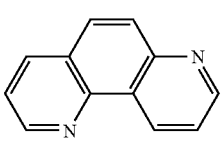 | 5% | 85%-90% | 1,503 |
| 7 | PMMA, MMA, separating means, photostarter at a weight ratio of 78:20:1:1 | benz[z]anthracene | 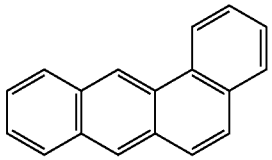 | 5% | 70% | 1,502 |
| 8 | PMMA, MMA, separating means, photostarter at a weight ratio of 78:20:1:1 | 1,2 benzioxazole | 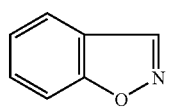 | 10% | <70% | 1,504 |
| 9 | PMMA, MMA, separating means, photostarter at a weight ratio of 78:20:1:1 | benzofurane | 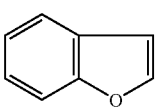 | 10% | <60% | 1,500 |
| 10 | PMMA, MMA, separating means, photostarter at a weight ratio of 78:20:1:1 | triphenylene | 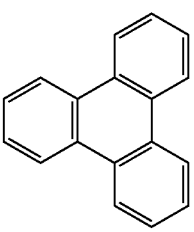 | 2.50% | <50% | 1,499 |
| 11 | PMMA, MMA, separating means, photostarter at a weight ratio of 78:20:1:1 | anthracene | 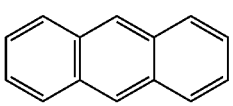 | 2% | <50% | 1,493 |

TABLE 1-continued

| No | liquid starting batch | organic compound | structure | maximum filling degree | transmission (1550 nm) | refractive index (633 nm) |
|---|---|---|---|---|---|---|
| 12 | PMMA, MMA, separating means, photostarter at a weight ratio of 78:20:1:1 | 2,3 benzanthracene | | 5% | <30% | — |
| 13 | PMMA, MMA, separating means, photostarter at a weight ratio of 78:20:1:1 | 11H-benzo[b]fluorene | | 5% | <30% | — |
| 14 | PMMA, MMA, separating means, photostarter at a weight ratio of 78:20:1:1 | phenazine | | 1% | <10% | — |
| 15 | PMMA, MMA, separating means, photostarter at a weight ratio of 78:20:1:1 | benzanthrone | | 2% | <10% | — |
| 16 | PMMA, MMA, separating means, photostarter at a weight ratio of 78:20:1:1 | 2,4,6-tri-(2-pyridyl)-1,3,5-triazine | | 5% | <10% | 1,491 |
| 17 | PMMA, MMA, separating means, photostarter at a weight ratio of 78:20:1:1 | 2,4,6-triphenyl-1,3,5-triazine | | 5% | <10% | — |
| 18 | PMMA, MMA, separating means, photostarter at a weight ratio of 78:20:1:1 | triptyzene | | 10% | <10% | — |
| 19 | PMMA, MMA, separating means, photostarter at a weight ratio of 78:20:1:1 | 2,1-benzioxazole (anthranile) | | 1% | <10% | — |

The invention claimed is:

1. An optical wave guide comprising a core, wherein said core comprises a polymer and at least one organic compound, wherein the organic compound is selected from the group consisting of benzoquinoline, 1,10-phenanthroline, phenanthridine, and 1,7-phenanthroline.

2. An optical wave guide comprising a core, wherein said core comprises a polymer and at least one organic compound, wherein the organic compound is selected from the group consisting of 1,2-benzoxazole and benzofuran.

3. The optical waveguide of claim 1, wherein the polymer is polymethylmethacrylate or polyester.

4. The optical waveguide of claim 2, wherein the polymer is polymethylmethacrylate or polyester.

5. An optical wave guide comprising a core, wherein said core comprises a polymer and at least one organic compound, wherein the organic compound is selected from the group consisting of benzoquinoline, 1,10-phenanthroline, phenanthridine, 1,7-phenanthroline, 1,2-benzoxazole and benzofuran.

6. An optical wave guide comprising a core, wherein said core comprises a polymer and at least one organic compound, wherein the organic compound is selected from the group consisting of benzoquinoline, 1,10-phenanthroline, 1,7-phenanthroline, 1,2-benzoxazole and benzofuran.

7. An optical wave guide comprising a core, wherein said core comprises a polymer and at least one organic compound, wherein the organic compound is selected from the group consisting of benzoquinoline, 1,10-phenanthroline, 1,7-phenanthroline, and 1,2-benzoxazole.

8. The optical waveguide of claim 5, wherein the polymer is polymethylmethacrylate or polyester.

9. The optical waveguide of claim 6, wherein the polymer is polymethylmethacrylate or polyester.

10. The optical waveguide of claim 7, wherein the polymer is polymethylmethacrylate or polyester.

* * * * *